H. E. LAMBERT.

TOOL FOR CLINCHING FENCE WIRES.

No. 10,799. Reissued Jan. 18, 1887.

Witnesses

C. L. Taylor

E. G. Siggers

Inventor

Henry E. Lambert.

By his Attorneys

C. A. Snow & Co.

N. PETERS, Photo-Lithographer, Washington, D. C.

UNITED STATES PATENT OFFICE.

HENRY E. LAMBERT, OF LOGANSPORT, INDIANA.

TOOL FOR CLINCHING FENCE-WIRES.

SPECIFICATION forming part of Reissued Letters Patent No. 10,799, dated January 18, 1887.

Original No. 341,665, dated May 11, 1886. Application for reissue filed December 18, 1886. Serial No. 221,999.

*To all whom it may concern:*

Be it known that I, HENRY E. LAMBERT, a citizen of the United States, residing at Logansport, in the county of Cass and State of Indiana, have invented a new and useful Improvement in Swage-Blocks, of which the following is a specification, reference being had to the accompanying drawings.

My invention relates to improvements in swage-blocks; and it consists of the peculiar and novel construction and adaptation of parts, substantially as hereinafter fully described, and specifically pointed out in the claims.

The primary object of my invention is to provide a swage-block which is especially adapted for use in affixing the points of the wire-securing staples of a fence to a metallic fence-post, which device shall be very cheap, strong, simple, and durable in construction, thoroughly effective for the purposes designed, and easy and ready of operation and adjustment.

Figure 2:
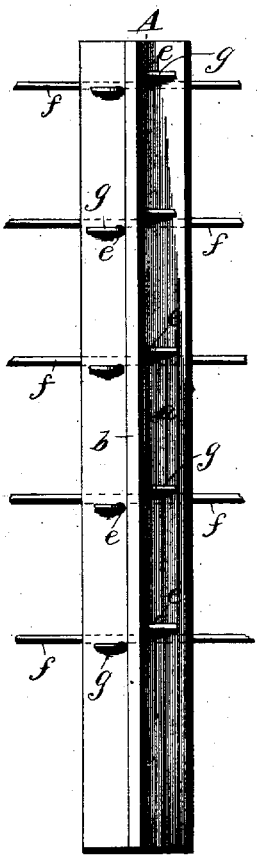
Figure 3:
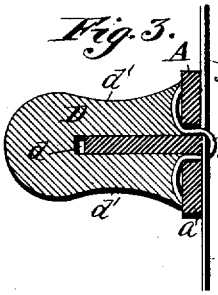
Figure 1:
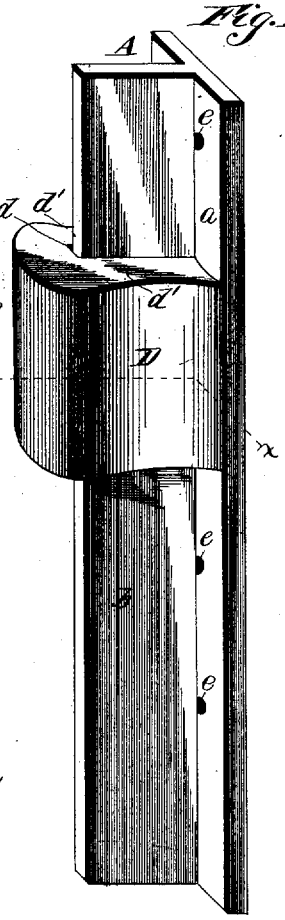
Figure 4:
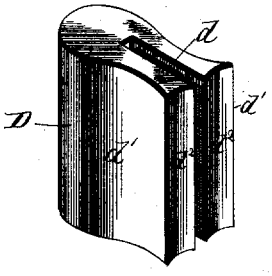

In the accompanying drawings, Figure 1 is a perspective view of my improved swage-block in proper position upon the guiding-flange of a fence-post. Fig. 2 is a view of the post after the staples have been clinched or secured thereto to hold the wires of the fence in place. Fig. 3 is a longitudinal sectional view through the swage-block and a portion of the post on the line *x x* of Fig. 1, and Fig. 4 is a detail perspective view of my improved swage-block.

Referring to the drawings, in which similar letters of reference indicate corresponding parts in all the figures, A designates a fence-post which is made of metal and provided with a rearwardly-extending flange, *b*, over which my improved swage-block D fits, and is adapted to be adjusted vertically thereon to different points for the purpose of clinching the ends or points of the wire-securing staples *g* to the post. The fence-post is of the ordinary or any preferred form, and it has the openings therein for the reception of the staples *g*, which are located on opposite sides of the flange *b* and one above another, two openings being provided for the two points or ends of one of the staples *g*. The flange *b* is ordinarily employed for the purpose of strengthening the post and increasing the stability thereof, and I propose to use the strengthening rib or flange for the purpose of guiding my improved swage-block, so that it can be very readily adjusted up or down and bear very firmly against the straight face of the post proper when the staples *g* are to be secured thereto to hold the fence-wires *f* in place. The swage-block D is made of such size and shape that it can be very firmly grasped and held by the hand of the operator while securing the staples and wires to the post, and the said block is provided with a longitudinal slot, *d*, which forms two arms, *d'*. These arms fit over the strengthening and guiding rib or flange *b* of the post A, and on opposite sides thereof, and the inner faces of the free ends of the arm are grooved or hollowed out longitudinally, as at $d^2$, whereby, when the staples are driven through the openings *e* in the post A by means of a hammer or other suitable implement in the hands of the operator, the inner ends or points of the staples will be turned laterally by contact with the longitudinally-grooved faces of the arms of the swage-block, and will be caused to bear against the post very firmly to support the fence-wires *f* in proper position.

The operation of my invention is as follows: One of the wires *f* of the fence is properly adjusted against one of the faces of the post. The points or ends of a staple, *g*, are fitted into two openings, *e*. The swage-block D is adjusted on the guiding-flange so that its arms straddle the same and the grooved faces register with the openings. The staple *g* is now forced or driven inwardly by a hammer or other suitable implement in the hands of the operator, and when its points come in contact with the arms of the swage-block they will be bent laterally, so that the staple will be rigidly connected to the post to hold the wire upon the same. The swage-block is now removed and adjusted to another pair of the staple-receiving openings; or it may be slid downwardly or upwardly on the flange *b* to the proper point, and the operation above described is repeated for each staple and wire secured to the post, as will be very readily understood.

I hereby reserve the right to apply for subsequent patents on any improvement shown herein, but not claimed, and forming proper subject-matter for an independent application.

Having thus fully described my invention, what I claim as new, and desire to secure by Letters Patent, is—

1. A swage-block having a slot adapted to fit over and receive the guiding-flange of a fence-post to clinch the wire-securing staples thereto, substantially as described.

2. A swage-block having two arms and a central slot which receives a guiding-flange for a fence-post, the arms fitting on opposite sides of the flanges and adapted to clinch the ends of the wire-securing staples, substantially as described.

3. A swage-block having a central slot and arms having their free edges provided with grooves to clinch the ends of wire-securing staples to a fence-post, substantially as described.

In testimony that I claim the foregoing as my own I have hereto affixed my signature in presence of two witnesses.

HENRY E. LAMBERT.

Witnesses:
B. ANDREWS,
C. H. WOOD.